(12) United States Patent  
Nehl et al.

(10) Patent No.: US 8,651,250 B2
(45) Date of Patent: Feb. 18, 2014

(54) MAGNETORHEOLOGICAL DEVICES WITH PERMANENT MAGNET FIELD BIAS

(76) Inventors: Thomas Wolfgang Nehl, Shelby Township, MI (US); Alexander A. Alexandridis, Orchard Lake Village, MI (US)

(*) Notice: Subject to any disclaimer, the term of this patent is extended or adjusted under 35 U.S.C. 154(b) by 574 days.

(21) Appl. No.: 12/287,951

(22) Filed: Oct. 15, 2008

(65) Prior Publication Data

US 2010/0089711 A1    Apr. 15, 2010

(51) Int. Cl.
*F16F 15/03* (2006.01)
*F16F 9/53* (2006.01)

(52) U.S. Cl.
USPC ........................ 188/267; 188/267.2

(58) Field of Classification Search
USPC ............... 188/267, 267.2, 267.1, 266.3, 290, 188/322.13–322.22; 267/140.14, 140.15
See application file for complete search history.

(56) References Cited

U.S. PATENT DOCUMENTS

| 4,673,067 A * | 6/1987 | Munning et al. ........... 188/266.4 |
| 5,064,032 A * | 11/1991 | Ashiba ....................... 188/282.4 |
| 5,372,223 A * | 12/1994 | DeKock ...................... 188/285 |
| 5,492,312 A * | 2/1996 | Carlson ..................... 267/140.14 |
| 5,632,361 A | 5/1997 | Wulff et al. |
| 6,386,343 B1 * | 5/2002 | Robinson et al. ............. 188/267 |
| 6,419,057 B1 | 7/2002 | Oliver et al. |
| 6,547,044 B2 * | 4/2003 | Lisenker et al. ........... 188/267.2 |
| 7,219,781 B2 | 5/2007 | Akami et al. |
| 2006/0009891 A1 * | 1/2006 | Pawlak et al. ................... 701/37 |

* cited by examiner

*Primary Examiner* — Bradley King
*Assistant Examiner* — Stephen Bowes
(74) *Attorney, Agent, or Firm* — Dickinson Wright PLLC

(57) ABSTRACT

A magneto-rheological damping device comprises a piston and a case element, both capable of acting to carry a magnetic flux. A passage exists between the piston and the case element, and an amount of MR fluid is positioned between the piston and the case element to flow within the passage.

A first magnetic flux generator and a second magnetic flux generator cooperate to generate a net flux that is disposed to act upon the MR fluid in the passage to affect the flow of fluid in the passage.

One of the flux generators comprises a permanent magnet to generate a bias flux between the piston and the case element, and the other flux generator comprises a means for providing a controllable magnetic flux between the piston and the case element.

9 Claims, 5 Drawing Sheets

MAGNETORHEOLOGICAL DEVICES WITH PERMANENT MAGNET FIELD BIAS

FIELD OF INVENTION

This invention relates generally to magnetorheological (MR) devices and more particularly to an improved design for an MR damping device.

BACKGROUND OF THE INVENTION

Devices for suspending parts and controlling or damping their movement relative to one another are known in the art. For example, such devices are known and used in the automotive field in vehicle suspension systems. The devices might take the form of shock absorbers, struts, and other motion or vibration damping structures.

Generally, many of those devices utilize fluids for controlling the relative movement of the mechanical parts. For example, hydraulic fluid may be utilized as a medium for creating damping forces or torques or controlling motion. One class of such movement control devices utilizes a fluid medium that is controllable through the use of magnetic fields. Such magnetically controlled fluid is referred to as magnetorheological, or MR fluid. MR fluids exhibit a thickening behavior (a rheology change) upon being exposed to magnetic fields of sufficient strength. The higher the magnetic field strength to which the MR fluid is exposed, the higher the flow restriction or damping force that can be achieved in the MR device. It may be desirable to utilize this behavior of MR fluids to control the damping of an MR device, for example to modify the ride characteristics of a vehicle in response to driver input or road conditions.

An MR device may use an electromagnet comprising an electric current flowing through a coil to apply a magnetic field to affect the flow properties of the MR fluid. The damping force of the MR device is a function of the current supplied to the electromagnet. If no current is applied to the electromagnet, damping is at a minimum level. The damping level with no magnetic field applied may be lower than would be desirable for most vehicle operating conditions. For the majority of vehicle operating time, a current must be constantly supplied to provide a desired level of damping. This current requirement adds a load to the vehicle electrical system, which may adversely affect fuel economy. Also, the wire used to form the electromagnet, as well as the vehicle wiring harness and connectors, must be sized appropriately to accommodate the current level required. Additionally, the low damping level with no magnetic field applied may be undesirable from a vehicle control standpoint if there is an interruption of the control current to the damper.

In order to reduce operating current and/or to provide a desirable level of damping in the absence of current, it is known in the art to include a permanent magnet in an MR device to supply a bias magnetic flux. For example, U.S. Pat. Nos. 5,632,361 and 6,419,057 show such an approach. The bias flux increases the damping force of the MR device in the absence of current through the electromagnet. The electromagnet can be used to provide magnetic flux to supplement the bias flux.

In using an MR device, an important characteristic is what is referred to as the "turn-up ratio". Turn-up ratio is defined as the ratio of the maximum force or torque generated by the MR device divided by the minimum force or torque output for the same device. In designing controllable MR actuators it is generally desirable to maximize the turn-up ratio under given operating conditions. The turn-up ratio is maximized by increasing the torque or force available when the MR fluid is exposed to a maximum magnetic field and/or by minimizing the torque or force output when the fluid is exposed to a minimum magnetic field. In a conventional MR device where the entire magnetic field is generated by an electromagnet, the minimum magnetic field is achieved by applying zero current to the electromagnet, which results in no induced magnetic field. For such a device turn-up ratio is dependent mainly on the characteristics of the MR fluid, namely the yield strength of the fluid with a magnetic field applied and the viscosity of the fluid in the absence of a magnetic field.

Adding a permanent magnet to an MR device to supply a bias magnetic flux can have undesirable effects. Prior art configurations are known that make it impossible to completely counter the bias flux, resulting in a significant level of flux always operating on the MR fluid to raise the minimum force output and thus lower the turn-up ratio. Known prior art configurations may require significant current levels to counter the bias flux to achieve low minimum force, as is required to achieve a desirably high turn-up ratio. Prior art configurations are also known that require expensive permanent magnet material to reduce the risk of the electromagnet's flux demagnetizing the permanent magnet.

Thus, what is desired is an MR damper that will reduce the current requirements in controlled operation and provide a greater than minimum level of damping when the power source is off, while maintaining a high turn-up ratio.

SUMMARY OF THE INVENTION

The present invention is an MR device that provides a higher than minimum level of damping when a power source to the MR device is not supplying a control current. The device of the present invention includes a piston, a first magnetic flux generator surrounding at least a portion of the piston, and a second magnetic flux generator surrounding at least a portion of the first magnetic flux generator. One of the magnetic flux generators comprises a permanent magnet, and the other magnetic flux generator comprises a coil to carry an electric current and act as an electromagnet. The permanent magnet is positioned to direct a magnetic flux across an MR fluid path causing a resistance to MR fluid flow. A damping force opposing relative motion between the piston and another element of the MR device is dependent on the rheology of the MR fluid. An electric current through the coil provides a magnetic flux that can combine with the flux supplied by the permanent magnets to allow control of the damping force. By controlling the direction of current through the coil, the flux supplied by the coil can be controlled to a polarity to add to or subtract from the bias flux. The permanent magnet allows for damping when no control current is available, as well as reducing the peak current required for controlled damping. The coil and permanent magnet are disposed to allow complete cancellation of the flux directed across the MR fluid path by appropriate control of the current through the coil.

In the description of the present invention, the terms "surround", "surrounds", "surrounding", and the like are understood to be not limited to complete uninterrupted encirclement. For example, if a portion of the piston is disposed between two portions of a flux generator, that portion of the piston is to be considered "surrounded" by the flux generator. Thus, a flux generator can for example be comprised of a plurality of permanent magnet segments with spaces between the segments, wherein the magnet spaces and gaps together encircle the portion of the piston.

The various features and advantages of this invention will become apparent to those skilled in the art from the following detailed descriptions of the preferred embodiment. The drawings that accompany the detailed description are described as follows:

DETAILED DESCRIPTION

Figure 1:
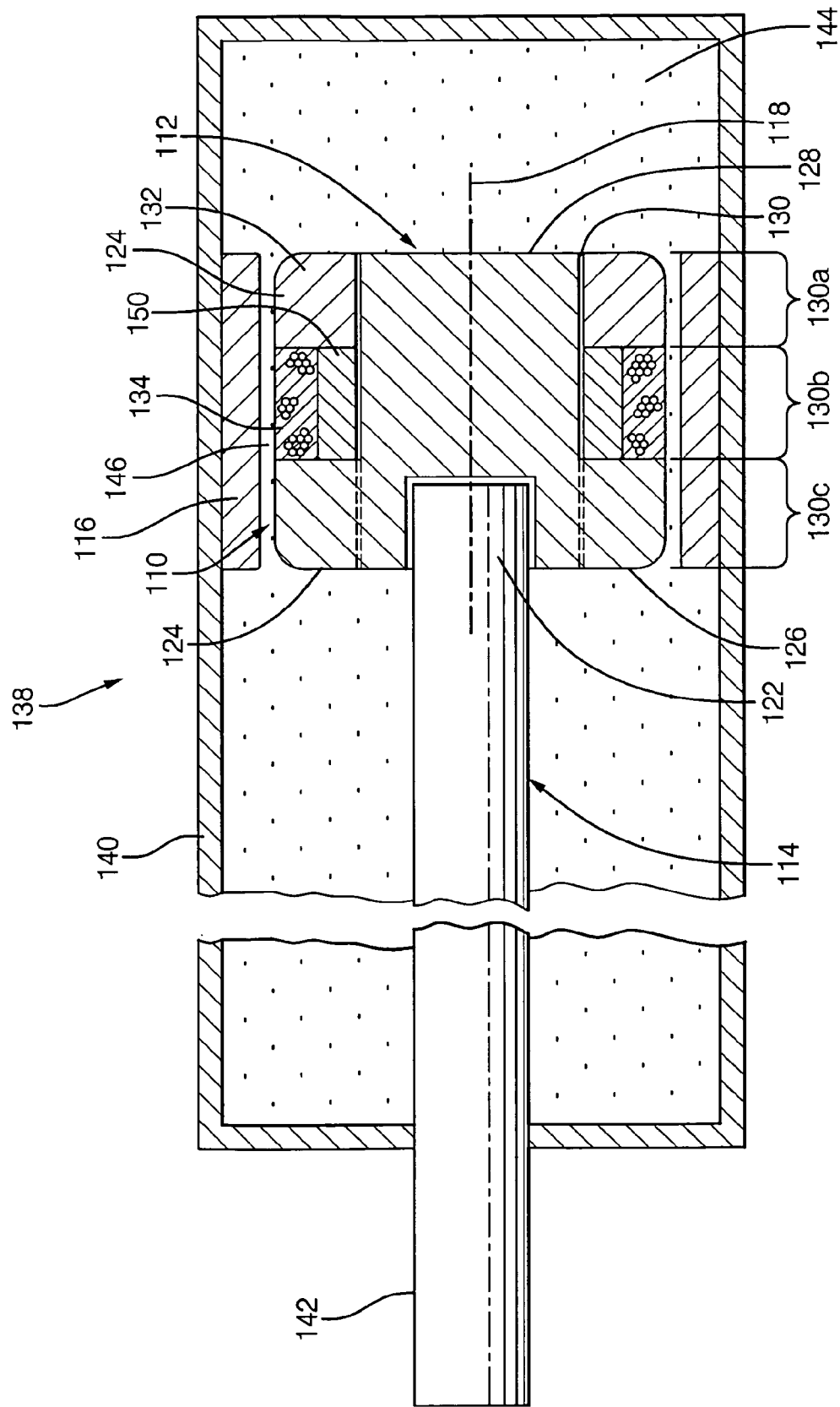
FIG. 1 is a longitudinal cross-sectional view of a first embodiment of a magnetorheological (MR) damper of the invention, including an MR piston assembly, showing the MR piston assembly with an electric coil assembly and a permanent magnet.

Referring now to the drawings, FIG. 1 shows an exemplary embodiment of the present invention. A magnetorheological damper 138 comprises a tube 140, piston assembly 110, and magnetorheological fluid 144. Piston assembly 110 includes piston 112, rod 114, flux ring 116, coil 134, and permanent magnet 150. The piston 112 comprises a material capable of carrying a magnetic flux. The piston has a longitudinal axis 118, a first longitudinal end 126, and a second longitudinal end 128. In one construction, the axis 118 defines an axis of symmetry about which elements are disposed in substantially cylindrical or annular fashion, but other non-circular constructions are possible. In FIG. 1, the piston 112 is shown as comprising a piston lower portion 124 and a piston upper portion 132, indicating that the piston may be made of a plurality of portions to facilitate assembly. Alternatively, suitable manufacturing techniques may be used to enable a single piece piston.

A case element also capable of carrying a magnetic flux surrounds the piston 112, so as to define a passage 146 between the case element and the piston 112. In FIG. 1, the case element is depicted as a flux ring 116 that moves axially with the piston 112 within the tube 140. In an alternate embodiment not shown, the flux ring 116 can be omitted and tube 140 can be made of a suitable magnetic material to act as the case element and carry the magnetic flux as well as to define the passage 146.

In the embodiment depicted in FIG. 1, an annular permanent magnet 150 is disposed so as to surround a portion of piston 112. Coil 134 is disposed around permanent magnet 150. Coil 134 has electrical connections (not shown) that allow an electric current to flow through the coil.

FIG. 1 also shows an annular magnetic gap 130, the function of which is disclosed below.

In the MR damper 138 shown in FIG. 1, the rod 114 has a first end portion 122 attached to first longitudinal end 126 of piston 112 and a second end portion 142 longitudinally extending outside the tube 140.

Referring to FIG. 1, in operation, when a force is applied to rod end portion 142 urging the piston 112 to axially move within tube 140, MR fluid 144 is urged to flow through the passage 146. The imparted force resisting the motion of the piston depends on the rheology of the MR fluid 144, which can be controlled by controlling the magnetic flux acting on the MR fluid 144 that is present in the passage 146.

Figure 2:
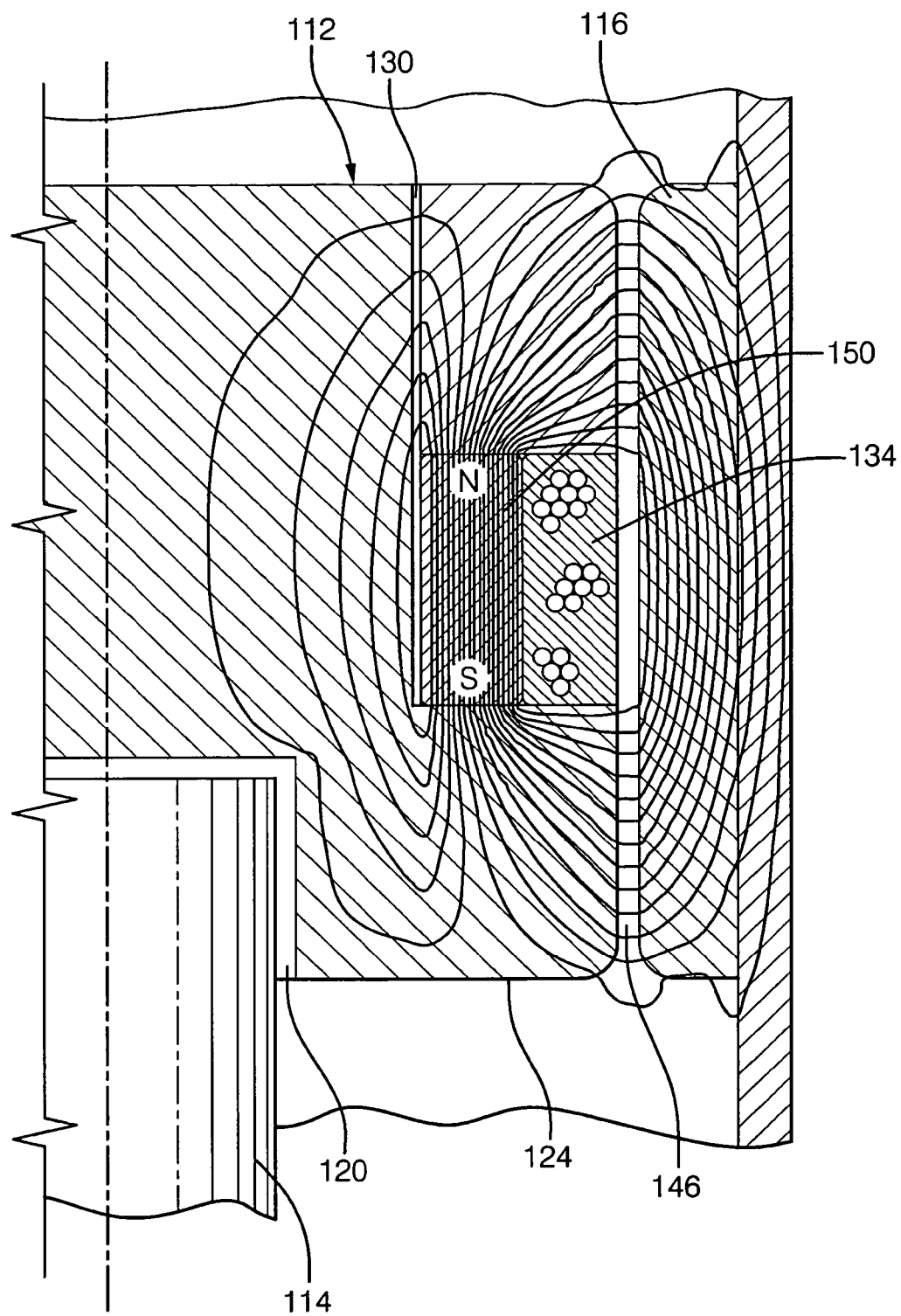
FIG. 2 is a diagram of magnetic flux distribution under a first operating condition.
Figure 3:
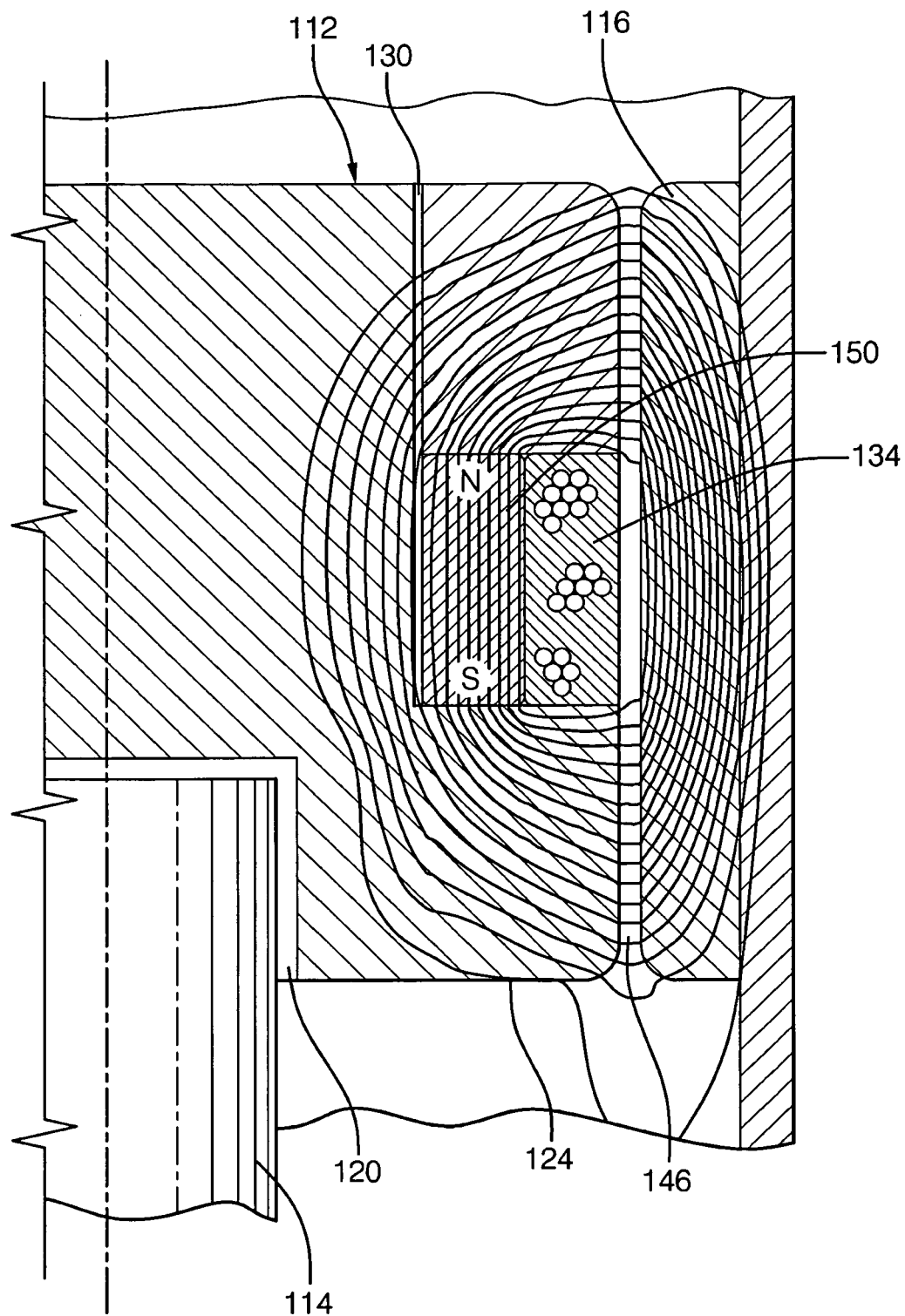
FIG. 3 is a diagram of magnetic flux distribution under a second operating condition.
Figure 4:
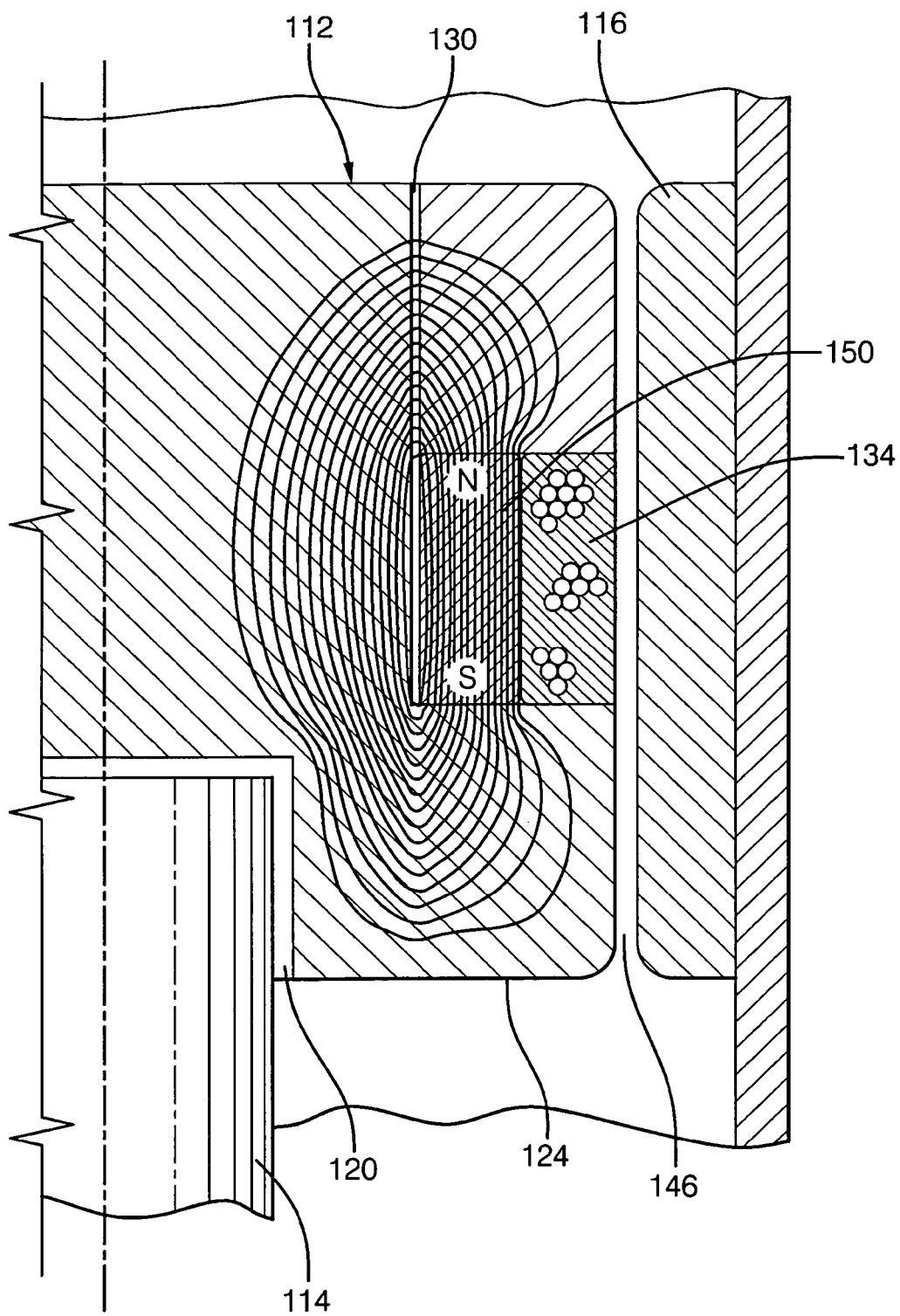
FIG. 4 is a diagram of magnetic flux distribution under a third operating condition.

FIGS. 2-4 shows the pattern of the magnetic flux through the magnetic circuit comprising passage 146, piston 112, magnetic gap 130, and the case element (which includes flux ring 116 and tube 140) under various operating conditions. FIGS. 2-4 also show a magnetic gap 120 between piston 112 and rod 114. Magnetic gap 130 comprises portions 130a, 130b, and 130c. Magnetic gap portion 130b is adjacent to permanent magnet 150, and serves to reduce flux leakage from the side of the permanent magnet 150. Coil 134 acts as a magnetic gap on the other side of the permanent magnet 150 to reduce flux leakage at that side. Magnetic gap portions 130a and 130c can be used either singly or together to favorably influence the distribution of flux through the magnetic circuit.

In FIG. 2, there is no current through coil 134, and the magnetic flux consists only of the bias flux generated by permanent magnet 150. Under this condition, there is significant magnetic flux present across passage 146 to influence the rheology of the MR fluid in the passage, and the resultant damping force will be at some level above the minimum level that would result if there was no magnetic flux. This magnetic circuit in conjunction with permanent magnet 150 can be used to establish a quiescent level of damping. Control of the damping level about the quiescent level can be accomplished by flux variation achieved by varying current levels through coil 134. Since the permanent magnet 150 is providing a bias flux, this configuration can reduce the electric current level required through coil 134 to achieve a desired level of damping. In addition, this configuration can provide a desirable fail-safe level of damping in the event of unintended interruption of electric current through the coil 134.

FIG. 3 shows the magnetic flux pattern when the current through coil 134 is of a polarity to generate flux that adds to the bias flux generated by permanent magnet 150 in the passage 146. Under this condition, the magnetic flux across the MR fluid in passage 146 is increased compared to the zero-current case depicted in FIG. 2, which desirably results in a controllable increase in damping force compared to the zero-current damping force. It should be noted that the presence of bias flux generated by the permanent magnet 150 enables a given level of damping force above the quiescent level to be achieved with less electric current through coil 134 than would be required if permanent magnet 150 was omitted and the entire magnetic field was generated by coil 134.

FIG. 4 shows the magnetic flux pattern that results when an electric current of appropriate magnitude and polarity is passed through coil 134 to generate magnetic flux of an appropriate magnitude and in a direction that opposes the bias magnetic flux generated by permanent magnet 150 in the passage 146. Under this condition, the resultant magnetic flux through the magnetic circuit results in substantially zero magnetic flux acting across the MR fluid in passage 146. As a result, the minimum damping force can be controlled to a low level, which is desirable in that it enables a high turn-up ratio to be achieved.

Results have shown unexpected benefits derived from inclusion of magnetic gap 120. Magnetic gap 120 in the structure of the MR device reduces the influence of rod 114 on the magnetic circuit if rod 114 comprises a magnetic material. With the presence of magnetic gap 120, the symmetry of the flux pattern through the magnetic circuit is improved, allowing controlled cancellation in passage 146 of the bias flux from the permanent magnet 150 by the magnetic flux generated by the coil 134.

If the electric current through the coil 134 is increased beyond the level represented in FIG. 4, the damping force will increase. This is because the MR fluid 144 is responsive to the absolute value of the magnetic flux through the passage 146 regardless of the polarity of the flux. As the coil 134 generates magnetic flux in excess of the level required to counter the flux generated by permanent magnet 150, the absolute value of the flux level in passage 146 rises above the minimum flux level and acts to increase the viscosity of the MR fluid in the passage 146, thus resulting in an increase in damping above the minimum damping level.

Figure 5:
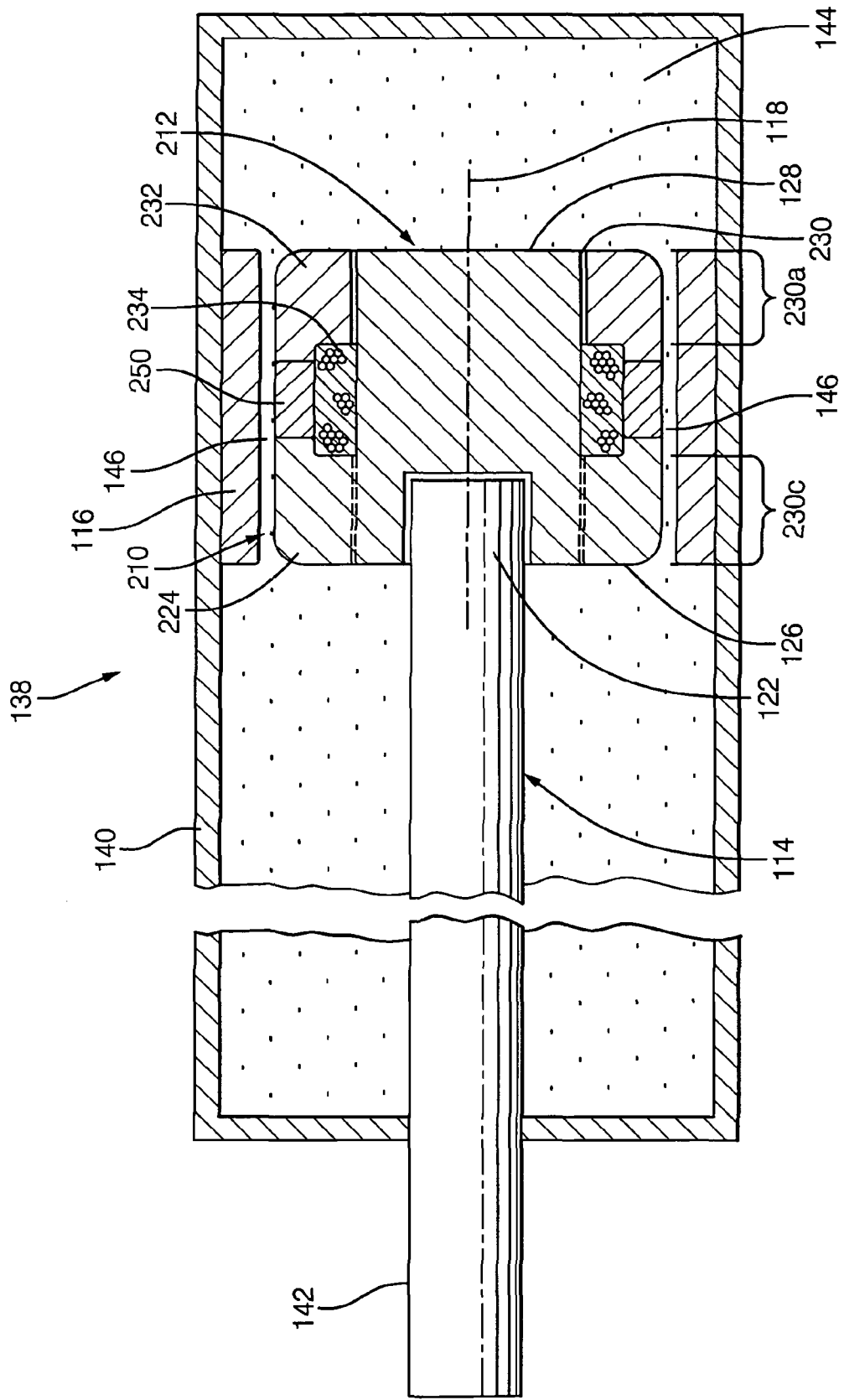
FIG. 5 is a longitudinal cross-sectional view of an alternate embodiment of the invention.

FIG. 5 shows an alternate embodiment of the present invention. In this embodiment, the permanent magnet 250 and the coil 234 are disposed on piston 212 with permanent magnet 250 surrounding coil 234. Coil 234 acts as a magnetic gap to reduce leakage flux though the side of permanent magnet 250. A magnetic gap 230 presenting magnetic gap portions 230a and 230c can be used either singly or together to favorably influence the distribution of flux through the magnetic circuit. FIG. 5 also illustrates that the permanent magnet 250 and the coil 234 are not limited to having the same axial length.

In other alternate embodiments, permanent magnet 150, coil 134, or both may be disposed as part of the case element, for example as part of flux ring 116.

It is noted that where a magnetic gap is disclosed, it is understood that practice of the present invention is not limited to a literal gap or void in the structure. A magnetic gap represents a region whose magnetic permeability is low compared to the permeability of the other elements of the magnetic circuit. A magnetic gap may be achieved by a void that is filled with air, MR fluid, or another substance having low magnetic permeability. In the event that the magnetic gap is formed by a void, a structural connection such as in the form of a web (not shown in the figures) may still be needed. Alternately, a magnetic gap may be achieved with a structural member comprising a low magnetic permeability material, such as but not limited to aluminum or non-magnetic stainless steel.

Additionally, the present invention is not limited to controlling linear motion along axis 118 as described above, but can additionally be applied to control reaction torque to a rotational moment applied to rod end portion 142 about axis 118. Thus, the present invention can for example be applied in a rotary damper, brake, or clutch.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and illustrative examples shown and described. Accordingly, departures may be made from such details without departure from the spirit or scope of the applicant's general inventive concept.

What is claimed is:

1. A magnetorheological device comprising:
   a piston having a high magnetic permeability and extending along an axis from a first end to a second end axially spaced from said first end;
   a rod having a high magnetic permeability connected to and extending from said first end of said piston along said axis;
   a case element surrounding at least a portion of said piston to define a passage between said piston and said case element;
   a first magnetic flux generator including a permanent magnet to generate bias magnetic flux between said piston and said case element;
   a second magnetic flux generator including an electromagnet for providing controllable magnetic flux between said piston and said case element;
   wherein said first magnetic flux generator is disposed radially outwardly of said second magnetic flux generator;
   said second magnetic flux generator surrounding a portion of said piston and said first magnetic flux generator surrounding at least a portion of said second magnetic flux generator and disposed adjacent said passage;
   a first magnetic gap having a low magnetic permeability being less than said high magnetic permeability of said piston and said rod and interconnecting said rod and said piston in an arrangement where said rod is devoid of contact with said piston for reducing magnetic influence of said magnetic flux generators on said rod and influencing the bias magnetic flux of said permanent magnet and the controllable magnetic flux of said coil to substantially cancel each other along said passage;
   said piston including a second magnetic gap having a low magnetic permeability being less than said high magnetic permeability of said piston disposed radially inwardly of at least one of said magnetic flux generators to define a cylindrical shape extending annularly within said piston with respect to said axis and longitudinally from one of said magnetic flux generators to a position flush with at least one of said ends of said piston for reducing leakage of the bias magnetic flux from said permanent magnet and influencing the bias magnetic flux of said permanent magnet and the controllable magnetic flux of said coil to substantially cancel each other along said passage; and
   said first magnetic gap and said second magnetic gap each made of aluminum or non-magnetic stainless steel.

2. The magnetorheological device of claim 1 wherein the first magnetic flux generator is the permanent magnet and the second magnetic flux generator is the coil.

3. The magnetorheological device of claim 2 wherein the piston includes a first annular magnetic gap portion circumferentially surrounded by the permanent magnet.

4. The magnetorheological device of claim 3 wherein the piston includes a second annular magnetic gap portion extending axially beyond a first axial end of the permanent magnet.

5. The magnetorheological device of claim 4 wherein the piston includes a third annular magnetic gap portion extending axially beyond a second axial end of the permanent magnet.

6. The magnetorheological device of claim 1 further comprising MR fluid positioned in said passage between said piston and said case element.

7. The magnetorheological device of claim 1 wherein said second magnetic gap extends axially from said second magnetic flux generator to one of said ends of said piston and abuts said second magnetic flux generator to terminate at said second magnetic flux generator.

8. The magnetorheological device of claim 1 wherein said second magnetic gap includes a first magnetic gap portion extending axially from said second magnetic flux generator to said first end of said piston and abutting said second magnetic flux generator to terminate at said second magnetic flux generator and a second magnetic gap portion extending axially from said second magnetic flux generator to said second end of said piston and abutting said second magnetic flux generator to terminate at said second magnetic flux generator.

9. The magnetorheological device of claim 1 wherein said first magnetic flux generator has a predetermined axial length and said second magnetic flux generator has an axial length being greater than said predetermined axial length of said first magnetic flux generator.

\* \* \* \* \*